(12) United States Patent
Benke et al.

(10) Patent No.: US 11,205,137 B2
(45) Date of Patent: Dec. 21, 2021

(54) DISTRIBUTED TRAINING IN A PARAMETER DATASET

(71) Applicant: International Business Machines Corporation, Armonk, NY (US)

(72) Inventors: Oliver Benke, Stuttgart (DE); Tobias U. Bergmann, Weinstadt (DE); Muhammad Usman Karim Khan, Karlsruhe (DE); Dominic Röhm, Wildberg (DE)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 16/009,913

(22) Filed: Jun. 15, 2018

(65) Prior Publication Data

US 2019/0385092 A1 Dec. 19, 2019

(51) Int. Cl.
*G06N 20/00* (2019.01)
*H04L 9/14* (2006.01)
*H04L 9/08* (2006.01)

(52) U.S. Cl.
CPC .......... *G06N 20/00* (2019.01); *H04L 9/0819* (2013.01); *H04L 9/14* (2013.01)

(58) Field of Classification Search
CPC ........ G06N 20/00; G06N 5/046; G06N 3/126; G06F 21/602; G06F 21/6218; H04L 9/14; H04L 9/0819; H04L 9/3239; H04L 2209/38; H04L 67/1097; H04L 63/0428; H04L 63/0876
See application file for complete search history.

(56) References Cited

U.S. PATENT DOCUMENTS

| | | | |
|---|---|---|---|
| 6,199,018 B1 | 3/2001 | Quist et al. | |
| 8,768,870 B1 | 7/2014 | Corrado et al. | |
| 9,521,158 B2* | 12/2016 | Di Pietro | ................ H04L 41/16 |
| 2003/0056093 A1* | 3/2003 | Huitema | ................ H04L 61/15 |
| | | | 713/156 |
| 2005/0227218 A1 | 10/2005 | Mehta et al. | |
| 2006/0184462 A1 | 8/2006 | Hawkins | |
| 2013/0290223 A1* | 10/2013 | Chapelle | ................ G06N 20/00 |
| | | | 706/12 |
| 2015/0106308 A1* | 4/2015 | Harrison | ................ G06N 3/126 |
| | | | 706/12 |

(Continued)

FOREIGN PATENT DOCUMENTS

JP 07038555 A * 2/1995 ............... G09C 1/00

OTHER PUBLICATIONS

"Invited talks: Abstracts", Private and Secure Machine Learning 2017, @ ICML 2017 Workshop, Sydney, Aug. 11, 2017, 7 pages, <https://sites.google.com/view/psml/program/abstracts>.

(Continued)

*Primary Examiner* — Michael R Vaughan
(74) *Attorney, Agent, or Firm* — Robert J. Shatto (57) ABSTRACT

A method for distributed training in a parameter dataset; the method for at least one coordinating node; a network of at least one distributed node; receiving a parameter dataset from a first distributed node; decrypting the received dataset; training the parameter dataset based on a training data record to obtain a trained parameter dataset; and forwarding the trained parameter dataset to a second distributed node.

18 Claims, 5 Drawing Sheets

(56) References Cited

U.S. PATENT DOCUMENTS

| | | | | |
|---|---|---|---|---|
| 2015/0193695 | A1* | 7/2015 | Cruz Mota | G06N 3/084 706/12 |
| 2016/0182170 | A1 | 6/2016 | Daoura et al. | |
| 2016/0358477 | A1 | 12/2016 | Ansari | |
| 2018/0320127 | A1* | 11/2018 | Cannon | C12M 41/14 |
| 2020/0133956 | A1* | 4/2020 | Cannon | G06F 16/27 |
| 2020/0327252 | A1* | 10/2020 | Mcfall | G06F 21/602 |

OTHER PUBLICATIONS

"Paillier cryptosystem", Wikipedia, This page was last edited on Apr. 4, 2018, 5 pages, <https://en.wikipedia.org/wiki/Paillier_cryptosystem>.

"Privacy & Security", Google for Education, Last printed May 9, 2018, 9 pages, <https://edu.google.com/k-12-solutions/privacy-security/?modal_active=none#does-google-sell-school-data-tothird-parties>.

"Protecting Student Privacy While Using Online Educational Services: Requirements and Best Practices", PTAC-FAQ-1, Feb. 2014, Privacy Technical Assistance Center, 14 pages, <https://tech.ed.gov/wp-content/uploads/2014/09/Student-Privacy-and-Online-Educational-Services-February-2014.pdf>.

"WOT Services", Wikipedia, This page was last edited on May 6, 2018, 5 pages, <https://en.wikipedia.org/wiki/WOT_Services>.

Amazon Mechanical Turk, "Tutorial: How to verify crowdsourced training data using a Known Answer Review Policy", Jun. 4, 2017, 10 pages, <https://blog.mturk.com/tutorial-how-to-verify-crowdsourced-training-data-using-a-known-answer-review-policy-85596fb55ed>.

Aono, et al., "Scalable and Secure Logistic Regression via Homomorphic Encryption*", CODASPY'16 Proceedings of the Sixth ACM Conference on Data and Application Security and Privacy, Mar. 9-11, 2016, New Orleans, LA, USA, pp. 142-144.

Aslett, et al., "A review of homomorphic encryption and software tools for encrypted statistical machine learning", Aug. 26, 2015, pp. 1-21, <https://arxiv.org/pdf/1508.06574.pdf>.

Aslett, et al., "Encrypted statistical machine learning: new privacy preserving methods", Aug. 27, 2015, pp. 1-39, <https://arxiv.org/pdf/1508.06845.pdf>.

Catrina, et al., "Secure Computation With Fixed-Point Numbers", Last printed May 8, 2018, pp. 1-16, <https://www1.cs.fau.de/filepool/publications/octavian_securescm/secfp-fc10.pdf>.

Cyphers, Bennett James, "A System for Privacy-Preserving Machine Learning on Personal Data", Masters Thesis, Massachusetts Institute of Technology, Sep. 20, 2017, pp. 1-85, <https://cyphe.rs/static/thesis.pdf>.

Dahl, Morten, "Private Deep Learning with MPC: A Simple Tutorial from Scratch", Apr. 17, 2017, 25 pages, <https://mortendahl.github.io/2017/04/17/private-deep-learning-with-mpc/>.

Dahl, Morten, "Secret Sharing, Part 1: Distributing Trust and Work", Jun. 4, 2017, 34 pages, <https://mortendah.github.io/2017/06/04/secret-sharing-part1/>.

Dahl, Morten, "Secret Sharing, Part 2: Efficient Sharing with the Fast Fourier Transform", Jun. 24, 2017, 23 pages, <https://mortendahl.github.io/2017/06/24/secret-sharing-part2/>.

Dowlin, et al., "CryptoNets: Applying Neural Networks to Encrypted Data with High Throughput and Accuracy", Proceedings of the 33rd International Conference on Machine Learning, New York, NY, USA, 2016, 10 pages.

Dowlin, et et., "Manual for Using Homomorphic Encryption for Bioinformatics", Last printed May 8, 2018, pp. 1-13, <https://www.microsoft.com/en-us/research/wp-content/uploads/2015/11/ManualHE-3.pdf>.

Esperanca, et al., "Encrypted accelerated least squares regression", Proceedings of the 20th International Conference on Artificial Intelligence and Statistics (AISTATS) 2017, Fort Lauderdale, Florida, USA, 10 pages.

Gascon, et al., "Privacy-Preserving Distributed Linear Regression on High-Dimensional Data", Cryptology ePrint Archive: Report 2016/892, last revised Oct. 17, 2017, 40 pages, <https://eprint.iacr.org/2016/892>.

Graepel, et al., "ML Confidential: Machine Learning on Encrypted Data", Last printed May 8, 2018, 15 pages, <https://eprint.iacr.org/2012/323.pdf>.

Hitaj, et al., "Deep Models Under the GAN: Information Leakage from Collaborative Deep Learning", Proceedings of the 2017 ACM SIGSAC Conference on Computer and Communications Security,, Oct. 30-Nov. 3, 2017, Session C3: Machine Learning Privacy, pp. 603-618.

Iamtrask, "Building Safe A.I.—A Tutorial for Encrypted Deep Learning", Mar. 17, 2017, 26 pages, <http://iamtrask.github.io/2017/03/17/safe-ai/>.

Iamtrask, "Safe Crime Detection—Homomorphic Encryption and Deep Learning for More Effective, Less Intrusive Digital Surveillance", Jun. 5, 2017, 28 pages, <http://iamtrask.github.io/2017/06/05/homomorphic-surveillance/>.

Lepoint, et al., "A Comparison of the Homomorphic Encryption Schemes FV and YASHE", Last printed May 8, 2018, pp. 1-18, <https://eprint.iacr.org/2014/062.pdf>.

McMahan, et al., "Communication-Efficient Learning of Deep Networks from Decentralized Data", Proceedings of the 20th International Conference on Artificial Intelligence and Statistics (AISTATS) 2017, Fort Lauderdale, Florida, USA, 11 pages, <https://arxiv.org/pdf/1602.05629.pdf>.

McMahan, et al., "Federated Learning: Collaborative Machine Learning without Centralized Training Data", Google at Blog, Thursday, Apr. 6, 2017, 7 pages, <https://ai.googleblog.com/2017/04/federated-learning-collaborative.html>.

Mell et al., "The NIST Definition of Cloud Computing", National Institute of Standards and Technology, Special Publication 800-145, Sep. 2011, 7 pages.

Patrini, Giorgio, "Distributed machine learning and partially homomorphic encryption (Part 1)", N1 Analytics, Jul. 13, 2017, 7 pages, <https://blog.n1analytics.com/distributed-machine-learning-and-partially-homomorphic-encryption-1/>.

Patrini, Giorgio, "Distributed machine learning and partially homomorphic encryption (Part 2)", N1 Analytics, Aug. 14, 2017, 6 pages, <https://blog.n1analytics.com/distributed-machine-learning-and-partially-homomorphic-encryption-2/>.

Singer, Natasha, "Privacy Pitfalls as Education Apps Spread Haphazardly", The New York Times, Mar. 11, 2015, 6 pages, <https://www.nytimes.com/2015/03/12/technology/learning-apps-outstrip-school-oversight-and-student-privacy-is-among-the-risks.html?_r=0>.

Tan, et al., "Privacy Preserving Anomaly Detection for Internet of Things Data", An ip.com Prior Art Database Technical Disclosure, ip.com No. IPCOM000252511D, ip.com Electronic Publication Date: Jan. 19, 2018, 6 pages.

Teerapittayanon, et al., "Distributed Deep Neural Networks over the Cloud, the Edge and End Devices", 2017 IEEE 37th International Conference on Distributed Computing Systems, pp. 328-339.

Thorne, Brian, "Ramblings about developing software. May contain traces of Java, Python, Scala, Typescript.", Bits of py, Open Source Paillier Libraries, Nov. 21, 2016, 4 pages, <https://bitsofpy.blogspot.co.uk/2016/11/open-source-paillier-libraries.html>.

Vivek, Srinivas, "Faster Homomorphic Function Evaluation using Non-Integral Base Encoding.", HEAT Project Blog: 2017, Friday, Apr. 28, 2017, 4 pages, <http://heat-h2020-project.blogspot.co.uk/2017/>.

Vivek, Srinivas, "Homomorphic Encryption API Software Library.", HEAT Project Blog, Tuesday, Feb. 21, 2017, 2 pages, <http://heat-h2020-project.blogspot.co.uk/2017/02/homomorphic-encryption-api-software.html>.

Yonetani, et al., "Privacy-Preserving Visual Learning Using Doubly Permuted Homomorphic Encryption", Jul. 28, 2017, 14 pages, <https://arxiv.org/pdf/1704.02203.pdf>.

Github, "OpenMind/PySyft," https://github.com/OpenMined/PySyft, printed Sep. 24, 2021, 9 pgs.

* cited by examiner

DISTRIBUTED TRAINING IN A PARAMETER DATASET

BACKGROUND

The present invention relates to data processing systems, and more specifically, to distributed training in a parameter dataset.

Privacy concerns are an inhibitor to the implementation of an Internet of Things (IoT) environment. The willingness of a consumer (e.g., individual, organization, etc.) to share data depends on the level of privacy protection that can be provided.

Data collection can help service providers improve their services. However, insight derived from data analysis can unintentionally reveal private information pertaining to consumers. For example, data from a household electricity usage meter can reveal the exact times when the occupants enter and/or leave the house; personal data which occupants may not be willing to share with others.

Conventional art teaches a predictive model in which data owners trust a centralized entity with personal data. Using any of the existing statistical analysis or machine learning algorithms, the centralized entity collects and aggregates all personal data to build a model. When privacy is of concern, consumers may not be comfortable sharing their personal data.

SUMMARY

Aspects of the present disclosure are directed to a method for distributed training in a parameter dataset. The method can comprise at least one coordinating node and a network of at least one distributed node coordinated by the at least one coordinating node. The method can further comprise receiving a parameter dataset from a first distributed node, where the dataset comprises weight changes. The method can additionally comprise decrypting the received dataset. Next, the method can comprise training the parameter dataset based on a training data record to obtain a trained parameter dataset. Lastly, the method can comprise forwarding the trained parameter dataset to a second distributed node.

Aspect of the present disclosure are further directed to a system for distributed training in a parameter dataset. The system can comprise at least one coordinating node and a network of at least one distributed node coordinated by the at least one coordinating node. The system can further comprise a computer readable storage medium, a user interface configured to receive input and present output and a processor communicatively coupled to the computer readable storage medium and the user interface and having a memory comprising instructions. When executed by the processor, the instructions can be configured to receive a parameter dataset from a first distributed node, where the parameter dataset comprises weight changes. The instructions can be further configured to decrypt the received dataset. The instructions can additionally be configured to train the parameter dataset based on a training data record to obtain a trained parameter dataset. Lastly, the instructions can be configured to forward the trained parameter dataset to a second distributed node.

Aspect of the present disclosure are further directed to a computer program product for distributed training in a parameter dataset. The computer program product can comprise at least one coordinating node and a network of at least one distributed node coordinated by the at least one coordinating node. The computer program product can further comprise a computer readable storage medium having program instructions embodied therewith. The program instructions can cause the processor to receive a parameter dataset from a first distributed node, where the parameter dataset comprises weight changes. The program instructions can further cause the processor to decrypt the received dataset. The program instructions can additionally cause the processor to train the parameter dataset based on a training data record to obtain a trained parameter dataset. Lastly, the program instructions can cause the processor to forward the trained parameter dataset to a second distributed node.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

While the present disclosure is amendable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Aspects of the present invention relates to data processing systems, and more specifically, to distributed training in a parameter dataset. While the present disclosure is not necessarily limited to such application, various aspects of the disclosure may be appreciated through a discussion of various examples using an artificial-intelligence-model.

Aspects of embodiments provide a method for distributed training in an artificial-intelligence-model comprising a parameter dataset network of distributed nodes, where trusted information is processed in private groups in a distributed setup. As used herein, a node may be a dedicated computing node, but not limited as such.

For training purposes, aspects of embodiments further illustrate the parameter dataset of the artificial-intelligence-model, training a first dataset comprising data (e.g. weight changes of model parameters). Thus, the artificial-intelligence-model parameter dataset may be identical to a term model. Alternatively, the dataset may only comprise weight changes of an iteration and not the complete model itself.

Aspects of embodiments can be understood with conventional methods of machine learning and learning algorithms Implementation of the present disclosure can illicit numerous advantages without sharing personal data in industries comprising, but not limited to, education (e.g., teaching methods), automotive (e.g., identification, violations), medical (e.g., fitness levels, health concerns), and statistics (e.g., data aggregation).

For example, applications of the disclosure can analyze weaknesses and strengths of a student, identify the most appropriate subject to focus studying, and/or anonymously compares the student with similar students in a given subject for educational improvements.

Applications of the disclosure can, for example, analyze a mesh network of cars with sensor data. Using information generated from such implementation, drivers and vehicles can anonymously learn from other car sensors and driving behavior.

A further example may concern the Internet-of-Things (IOT) and computer usage and malware. Applications of the disclosure can allow a system to learn what activity might lead to an infection and how to prevent or repair it, given potentially complete web usage patterns and to warn others in the community if a new attack vector gets known without imparting the complete clickstream which can be de-anonymized (e.g. WOT browser extension).

According to one embodiment a model parameter dataset for distributed training in an Artificial-Intelligence-model may be passed around serially, orchestrated by a coordinating node. A serial chain of nodes may be built by the coordinating node by handing out internet protocol addresses (IP addresses) and public keys of the node next-in-chain to each node. Noise may be added at initial setup time to prevent re-engineering of early contributors. The initial noise may decay with each subsequent model update. If a node fails silent, the next receiving node either contacts the coordinating node to resolve the issue and get the next in chain node.

If the used computer devices do not have known IP addresses and/or if they are not reachable from outside, as is usual if they are located behind a private router infrastructure, an alternative embodiment would be that the privately encrypted data is stored on some cloud storage accessible by multiple computers.

Each node updates the model based on its own private data and sends the new model in encrypted form to the node next-in-chain. The private data never leaves personally controlled space. The coordinating node cannot read the model in each step, but it can be made visible by adding the coordinating node at the end of the chain so it can publish the model once per iteration. One iteration is defined as a single updating of the model by one node.

According to a further embodiment the order in the chain may be randomized instead of using always the same order. Thus, none of the nodes knows from whom it got its model providing anonymity.

Additionally, in some embodiments, a serial chain of nodes may be built using peer-to-peer negotiation protocols. According to a further embodiment, a randomized order of nodes may be used, but orchestrated via a peer-to-peer method. In some embodiments, a central ledger of world readable intermediate models may be implemented, where each node picks a random model with a bias for more current models to improve convergence of the training process. Yet a coordinating node could re-engineer local information by looking at the deltas of single model updates.

Typically, using a ledger makes it impossible to change the dataset without making it noticeable to others. For this purpose, hash sums may be used in a similar manner as for a block chain environment. Therefore, according to some embodiments, a central ledger of personalized intermediate models issued, where each node has a list of the public keys of all nodes. Each node may pick a model that was encrypted for it with a bias for more current models to improve convergence of the training process. Each modified model may be dropped back onto the ledger encrypted for another random node. A coordinating node then cannot read the encrypted model and, thus, cannot reverse-engineer the updates In some embodiments, a central ledger of personalized intermediate models may be used, which is only readable for nodes next-in-chain. Thus, a serialized computation may be implemented.

Figure 1:
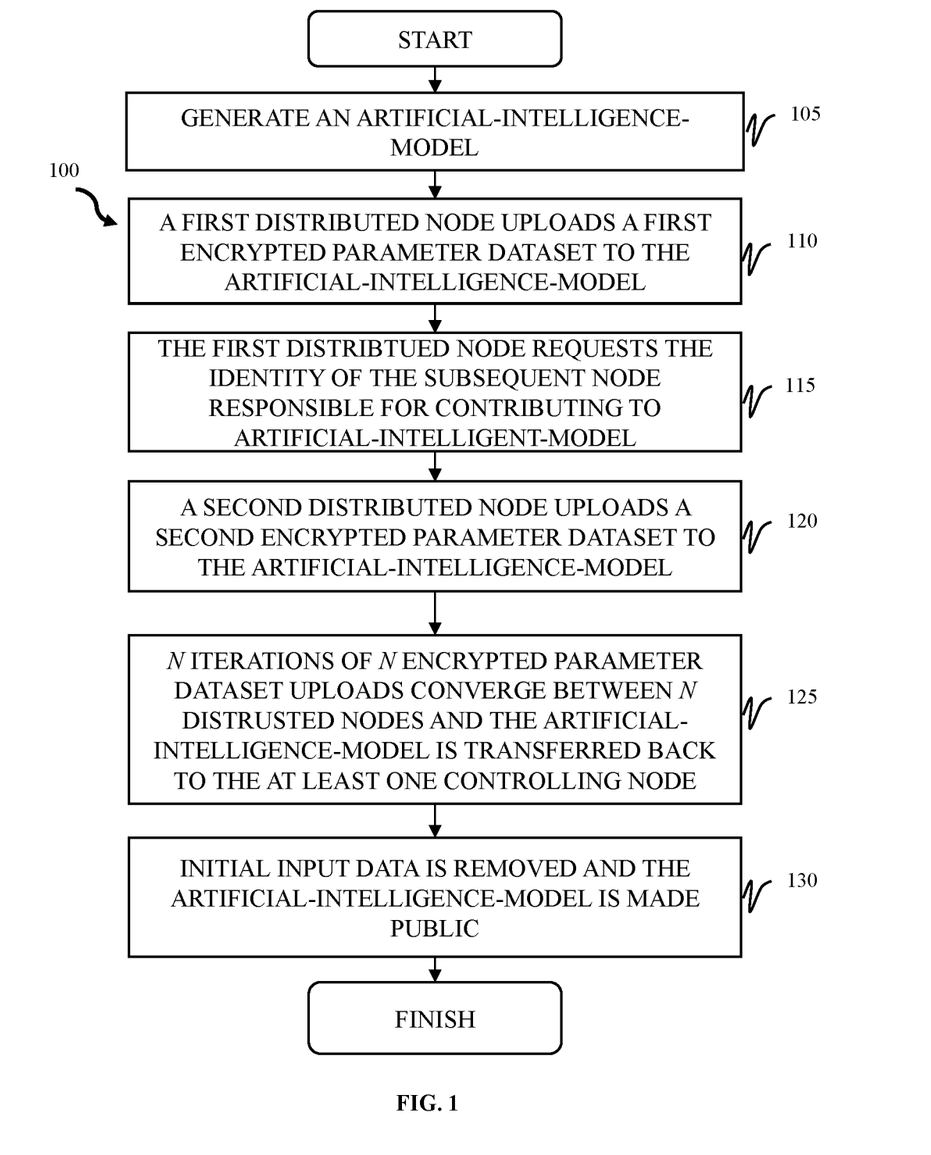
FIG. 1 is an example method 100 for distributed training in an artificial-intelligence-model parameter dataset, according to embodiments of the present disclosure.

Referring to the figures, FIG. 1 depicts an example method 100 for distributed training in an artificial-intelligence-model parameter dataset, with embodiment of the present disclosure. In embodiments, the method 100 begins in operation 105. In embodiments, the method 100 can be described in further detail with respect to FIGS. 2-4. In embodiments, the method 100 can be used for, for example, diabetes prediction among a subset of participants participating in a study.

In operation 105, at least one coordinating node (e.g., representing a clinic) generates, for example, a neural network representing a plurality of historical health data and issues a request to an at least one first distributed node (e.g., representing a first participant) to generate an artificial-intelligence-model. In embodiments, the historical data is used to determine a variable decision if a participant has, for example, diabetes, and an associated privacy level is determined from the variable decision. Historical data collected from the first distributed node is then forwarded to an at least second distributed node (e.g., representing a second participant).

In operation 110, the first distributed node separately uploads a first parameter dataset comprising, for example, collected wearable input data (e.g., steps per day, heart rate, body temperature, blood sugar, etc.) and personal information (e.g., age, weight, height, gender) to the artificial-intelligence-model and encrypts the separately uploaded data (e.g., first parameter dataset) in a format only readable by the second distributed node.

In operation 115, the second distributed node requests, from the coordinating node of operation 105, the identity of the subsequent node responsible for contributing (e.g., uploading data) next to the artificial-intelligence-model using distributed protocols. In embodiments, for example, a third distributed node would follow next.

Similar to the first distributed node in operation 110, the second distributed node in operation 120 uploads a parameter dataset comprising, for example, collected wearable input data (e.g., steps per day, heart rate, body temperature, blood sugar, etc.) and personal information (e.g., age, weight, height, gender), separately collected from the first distributed node, to the artificial-intelligence-model. Uploaded collected data from the second distributed node is encrypted in a format only readable by the third distributed node.

In operation 125, after the convergence of n iterations for collecting separately uploaded encrypted parameter datasets to the artificial-intelligence-model from n distributed nodes, the artificial-intelligence-model is unencrypted by the respective distributed nodes ensuring the artificial-intelligence-model to be publically available. From the last n distributed node, the artificial-intelligence-model is transferred back to the coordinating node.

In embodiments, the number of n iterations required for convergence may be dependent on the use case and the use of learning algorithm. Each round may consist of n iterations, with one iteration defined by updating of the artificial-intelligence-model by one distributed node.

In some embodiments, the artificial-intelligence-model may be encrypted to prevent third party entities from seeing the model. Optionally, in step 130, the coordinating node can remove, in operation 105, the initial input data (e.g., randomly collected data/noise) if supported by the learning algorithm and data on what is the initial noise still available to the coordinating node. As an alternative, it may be relied on the fact, that with large enough input data, contribution of initial noise decays automatically. Thus, only the separately collected data uploaded by the distributed nodes remains in the model.

In operation 130, the coordinating node aggregates the collected uploaded parameter datasets and makes the artificial-intelligence-model parameter datasets available for all distributed nodes comprised in the network configuration. In doing so, the identity of a distributed node responsible for an uploaded data to the artificial-intelligence-model is hidden.

FIG. 1 is intended to represent operations of the method 100 for distributed training according to embodiments of the present disclosure. In some embodiments, however, individual operations can have greater or lesser complexity than shown in FIG. 1, and operations other than, or in addition to those shown in FIG. 1 can be present. Furthermore, in some embodiments, various operations illustrated in FIG. 1 can have greater, lesser, or different functionality than shown in FIG. 1.

Figure 2:
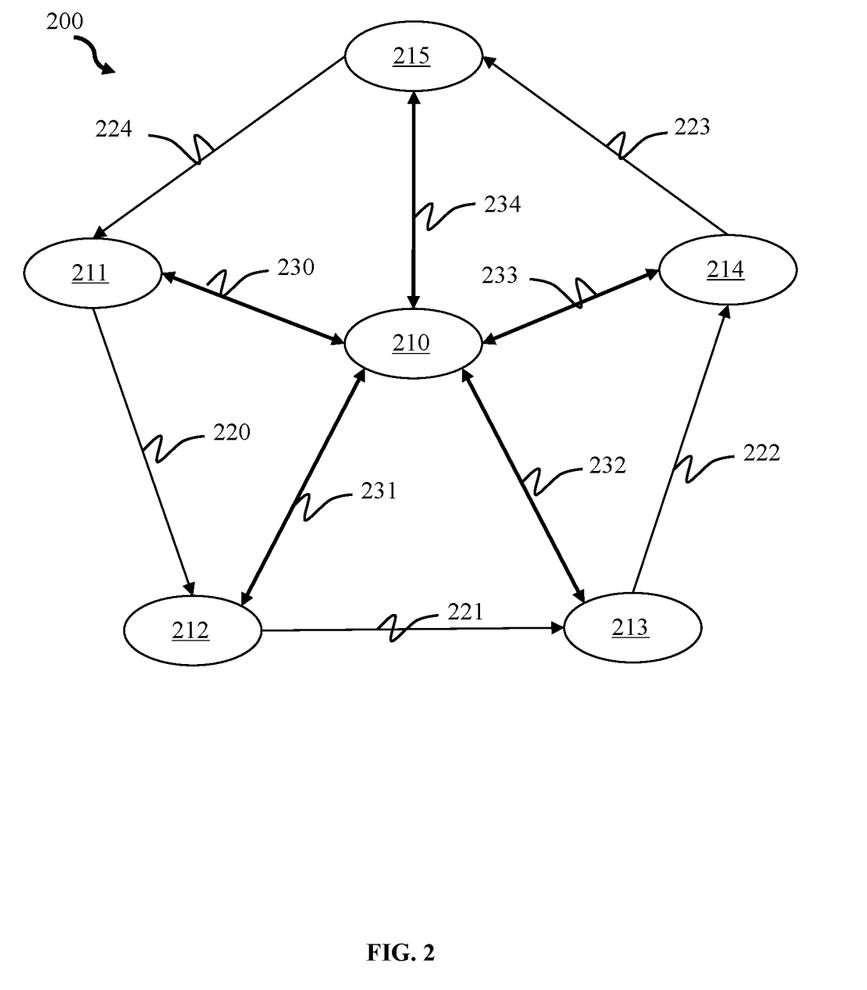
FIG. 2 is an example network 200 for distributed training environment in an artificial-intelligence-model parameter dataset, according to embodiments of the present disclosure.

FIG. 2 is an example network 200 for distributed training in an artificial-intelligence-model parameter dataset, in embodiments with the present disclosure. In embodiments, aspects of the network 200 can be configured to perform operations described above with respect to the method 100 of FIG. 1.

The network 200 includes at least one coordinating node 210, one or more distributed nodes 211-215, one or more data lines 220-224, and one or more message lines 230-234. The one or more distributed nodes are serially connected nodes in some embodiments.

In embodiments, the network 200 is organized as a ring of serially connected nodes 211, 212, 213, 214, 215, coordinated by at least one coordinating node 210. More generally the network 200 may be organized as a serial chain of connected nodes 211, 212, 213, 214, 215, coordinated by at least one coordinating node 210 and not connected in a ring-like manner.

In some embodiments, the network 200 may be organized in a randomized order of connected nodes 211, 212, 213, 214, 215, coordinated by at least one coordinating node 210, where the order is not fixed and predetermined. Instead the randomized order of connected nodes 211, 212, 213, 214, 215, may be changed after a certain number of iterations.

In embodiments, an encrypted parameter dataset representing private information may be received by, for example, a second serial connected node 212 from, for example, a first serial connected node 211 via the forward data line 220 and then, subsequently decrypted. A training algorithm is then applied on the decrypted dataset based on a training data record to obtain a trained dataset. Using the encrypted dataset, the second serial connected node 212 trains the received parameter dataset of the artificial-intelligence-model and encodes a result model with a public key for an at least third serial connected node 213 in network 200, to create a trained parameter dataset.

Prior to forwarding the trained dataset to the at least third serial connected node 213 and in iterations of training between serial connected node 214-215, the trained parameter dataset is encrypted. Thus, a key exchange occurs between serial connected nodes 211-215 connected via the at least one data line 220-224 and the received trained dataset is encrypted whenever leaving any one of serial connected nodes 211-215.

In embodiments, the trained parameter dataset is then forwarded from the at least second serial connected node 212 to the at least third serial connected node 213 via the forward data line 221. Iterations of training the dataset may continue in the same order until a data convergence is achieved. For example, the trained parameter dataset received in the at least third serial connected node 213 is forwarded to an at least fourth serial connected node 214 via data line 222. The trained dataset may be further forwarded from the at least fourth serial connected node 214 via data line 223 to an at least fifth serial connected node 215 and, after training in the at least fifth serial connected node 215 is complete, the trained parameter dataset will be forwarded back to the at least first serial connected node 211 via data line 224.

In embodiments, the at least one coordinating node 210 organizes the network 200 but does not see the dataset nor does it know the keys. The at least one message lines 230, 231, 232, 233, 234 serve for coordination of the network 200, but not for data transfer.

In some embodiments, the at least one coordinating node 210 may be part of the ring and publish the model after a certain number of iterations.

In some embodiments, the network 200 in the example embodiment of FIG. 1 is organized as a ring of serially connected nodes coordinated by at least one coordinating node. More generally the network 200 may be organized as a serial chain of connected nodes coordinated by at least one coordinating node and not connected in a ring-like manner.

In some embodiments, the network 200 may also be organized in a randomized order of connected nodes coordinated by at least one coordinating node, where the order is not fixed and predetermined. Instead the randomized order of connected nodes may be changed after a certain number of iterations.

In some embodiments, the network 200 may be coordinated by a peer-to-peer method, where the nodes are on the same level and information is equally distributed. The nodes coordinate information exchange in the network themselves.

FIG. 2 is intended to represent components of network 200 for a distributed training environment according to embodiments of the present disclosure. In some embodiments, however, individual components can have greater or lesser complexity than shown in FIG. 2, and components other than, or in addition to those shown in FIG. 2 can be present. Furthermore, in some embodiments, various components illustrated in FIG. 2 can have greater, lesser, or different functionality than shown in FIG. 2.

Figure 3:
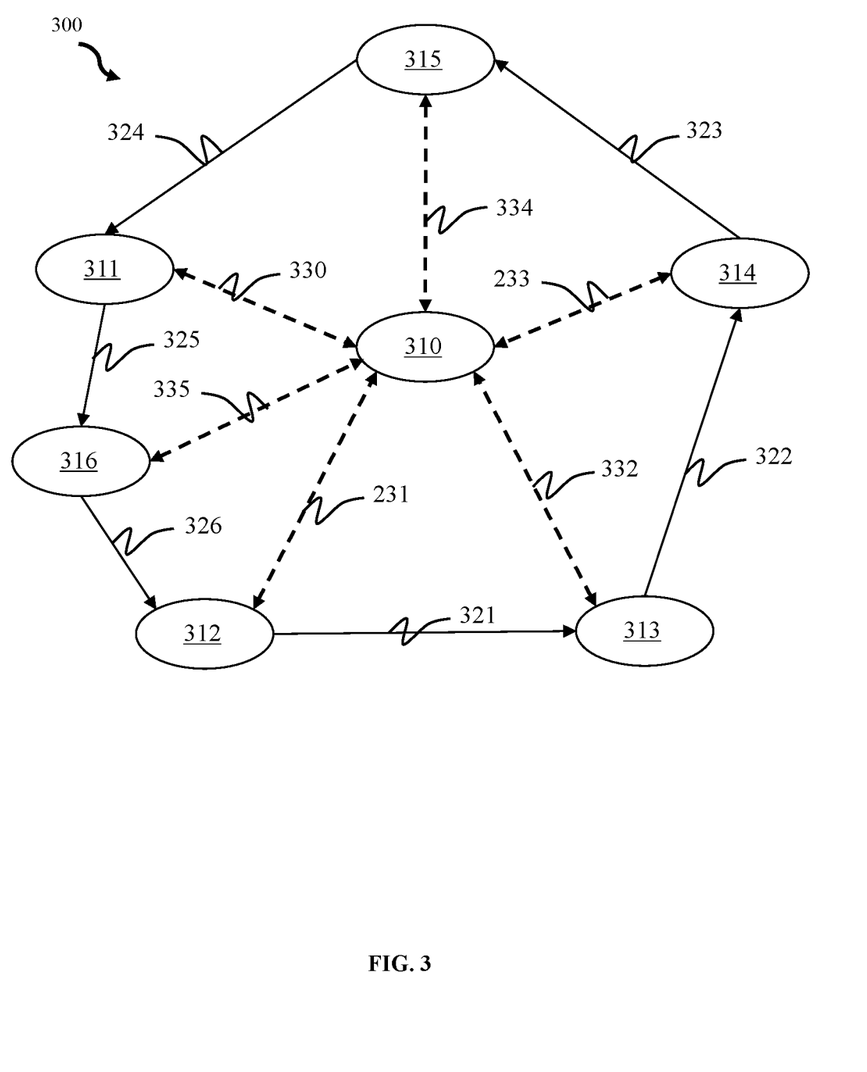
FIG. 3 is an example network 300 with a distributed node added in a distributed training environment, according to embodiments of the present disclosure.

FIG. 3 is an example network 300 with a distributed node added to a distributed training environment, in embodiments with the present. In embodiments, the network 300 can include aspects comprised in the method 100 of FIG. 1 and the network 200 of FIG. 2.

The network 300 includes at least one coordinating node 310 (similar to the at least one coordinating node 210 of FIG.

2), at least one distributed node 311-315, at least one new distributed node 216, at least one data line 321-324 (similar to the at least one data line 321-324 of FIG. 2), at least one new data line 325-326, at least one message line 331-334 (similar to the at least one message line 231-234 of FIG. 2), and at least one new message line 335. In embodiments, the network 300 is organized as a ring of at least one connected distributed nodes 311-315 and at least one new distributed node 316, coordinated by at least one coordinating node 310.

In embodiments, an at least one new distributed node 316 can be added to the network 300. The at least one new distributed node 316 initiates an 'Add User' request to the at least one coordinating node 310 to add an additional distributed node to the network 300. In response to the 'Add User' request, the at least one coordinating node 310 receives authentication information and begins verification at a third party trusted entity.

In embodiments, the at least one coordinating node 310 decides where to add the at least one new distributed node 316 in the network 300. In embodiments, the at least one coordinating node 310 tells the at least first distributed node 311 and at least second distributed node 312 to remove their existing keys.

In response to the removal of the at least first distributed node 311 and second distributed node 312 keys, original forward data line (not pictured) (similar to forward data line 220 of FIG. 2) is deleted. The at least one coordinating node 310 then tells the at least first distributed node 311 and at least one new distributed node 316 to exchange their keys and provides their corresponding IP addresses.

Next, the at least one coordinating node 310 tells the at least one new distributed node 316 via the at least new message line 335 and the at least one second distributed node 312 to exchange their keys and provide their corresponding IP addresses. In response to the exchange, new forward data line 325 and new forward data line 326 are established. The at least one message lines 330, 331, 332, 333, 334 and at least one new message line 335 serve for coordination of the network 300.

FIG. 3 is intended to represent components of network 300 with a distributed node added to a distributed training environment, according to embodiments of the present disclosure. In some embodiments, however, individual components can have greater or lesser complexity than shown in FIG. 3, and components other than, or in addition to those shown in FIG. 3 can be present. Furthermore, in some embodiments, various components illustrated in FIG. 3 can have greater, lesser, or different functionality than shown in FIG. 3.

Figure 4:
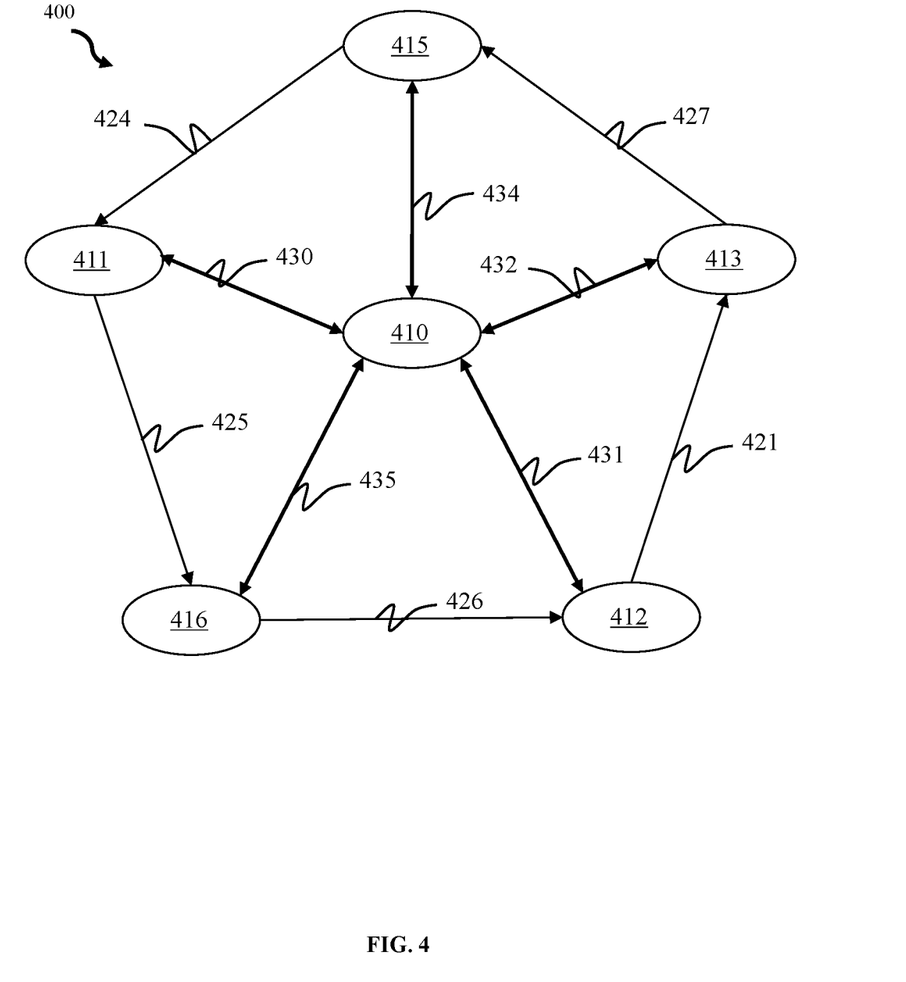
FIG. 4 depicts an example network 400 with a distributed node removed in a distributed training environment, according to embodiments of the present disclosure.

FIG. 4 is an example network 400 with a distributed node removed in a distributed training environment, in embodiments with the present. In embodiments, the network 400 can include aspects comprised in the method 100 of FIG. 1 and the network 200 of FIG. 2.

The network 400 includes at least one coordinating node 410 (similar to the at least one coordinating node 210 of FIG. 2), at least one distributed node 411, 412, 413, 415, 416 (similar to the at least one distributed node 311-313 and 315-316 of FIG. 3), at least one data lines 421, 424, 425, 426 (similar to the at least one data line 321, 324, 325, 326 of FIG. 3), at least one new data line 427, and at least one message line 430-432 and 434-435 (similar to at least one message line 330-332 and 334-335 of FIG. 3).

In embodiments, for example, at least one distributed node (not pictured) (similar to at least one distributed node 313 of FIG. 3) is removed from network 400. In response to the removal, at least one existing distributed node 411-413 and 415-416 can issue a 'Remove User' request to the at least coordinating node 410 and/or the at least one previous connected distributed node, for example, distributed node 413, may notice a timeout when trying to send a model. In such instances, the at least one coordinating node 410 partitions the network 400 and checks for split-brain situations comprised throughout the network 400, e.g. a partitioned network.

It is to be understood that, in some embodiments, a network with more than one coordinating node is used for implementing the operations described herein.

In embodiments, when the at least one coordinating node 410 removes the at least one distributed node, from the network 400, the forward data lines connected thereto (not pictured) are additionally removed. In response to the forward data lines removal, the at least one coordinating node 410 communicates directly to the at least one distributed node 413 and at least one distributed 415 such that the at least one removed distributed node exchange key is removed. As a result, at least one new forward data line 427 is established.

FIG. 4 is intended to represent components of network 400 with a distributed node removed in a distributed node configuration, according to embodiments of the present disclosure. In some embodiments, however, individual components can have greater or lesser complexity than shown in FIG. 4, and components other than, or in addition to those shown in FIG. 4 can be present. Furthermore, in some embodiments, various components illustrated in FIG. 4 can have greater, lesser, or different functionality than shown in FIG. 4.

Figure 5:
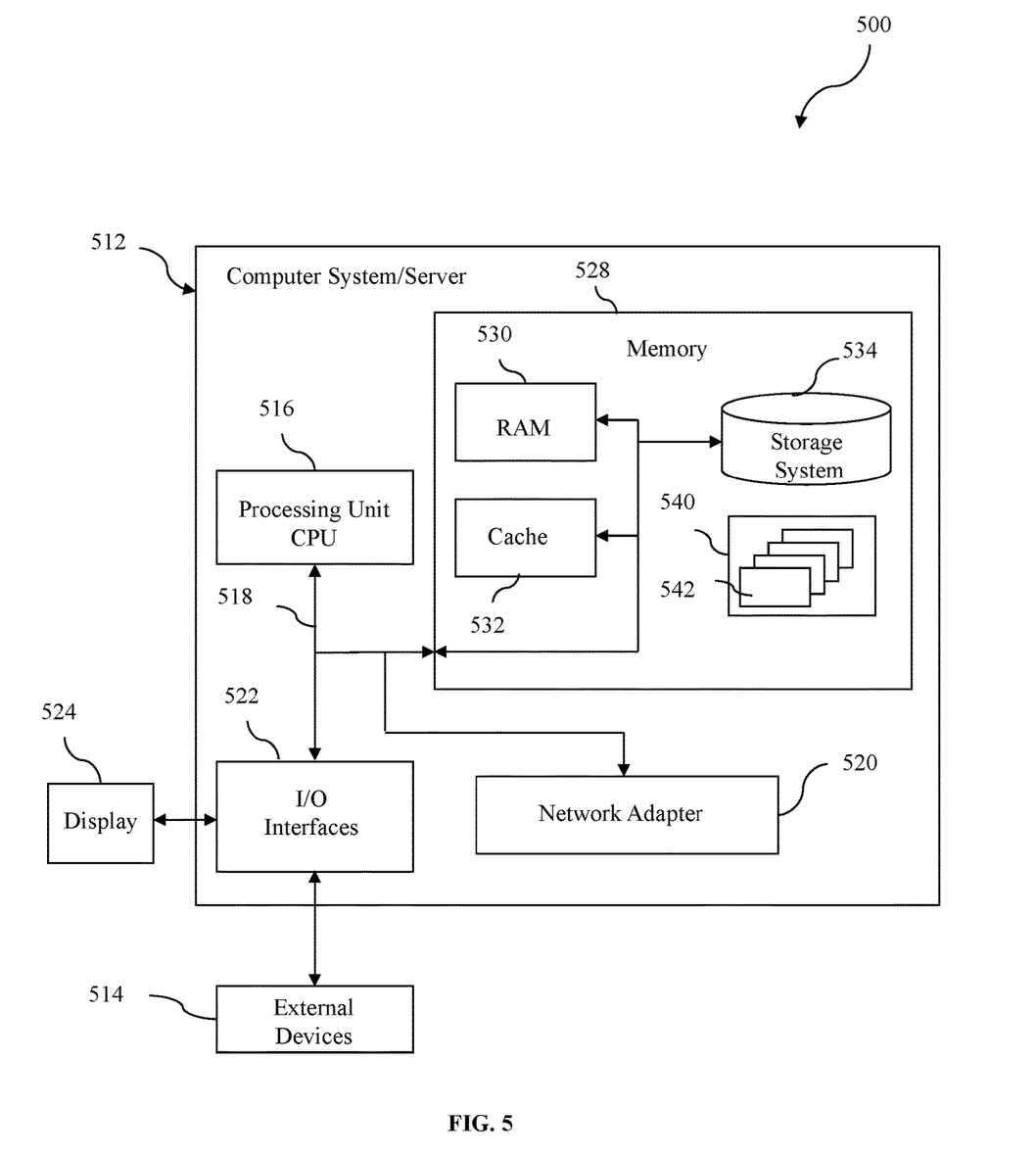
FIG. 5 depicts an example system 500 for data processing, according to embodiments of the present disclosure.

FIG. 5 is an example system 500 for data processing, in accordance with embodiments of the present disclosure. Data processing system 500 is only one example of a suitable data processing system and is not intended to suggest any limitation as to the scope of use or functionality of embodiments of the invention described herein. Regardless, data processing system 500 is capable of being implemented and/or performing any of the functionality set forth herein above.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in data processing system 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an Operating System, one or more application programs, other program modules, and program data. Each of the Operating System, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for distributed training in a parameter dataset, the method comprising:
   receiving, by a first distributed node in a network comprising a plurality of distributed nodes and at least one coordinating node, a parameter dataset from a neighboring node, wherein the parameter dataset comprises initial data, and wherein the parameter dataset was encrypted by the neighboring node using a public key of the first distributed node;
   decrypting, by the first distributed node, the parameter dataset using a private key for the first distributed node;
   adding, by the first distributed node, a first parameter dataset to the parameter dataset to create an updated parameter dataset;
   encrypting, by the first distributed node, the updated parameter dataset using a public key for a second distributed node in the network,
   forwarding, by the first distributed node, the encrypted updated parameter dataset to the second distributed node;
   removing, by either (i) one of the plurality of distributed nodes or (ii) the at least one coordinating node, the initial data from the parameter dataset after each distributed node of the plurality of distributed nodes has added data to the parameter dataset; and
   publishing, by either (i) one of the plurality of distributed nodes or (ii) the at least one coordinating node, after removing the initial data from the parameter dataset, the artificial-intelligence model.

2. The method according to claim 1, wherein the parameter dataset is encrypted.

3. The method according to claim 1, wherein the first distributed node exchanges a first key with the second distributed node, wherein the first key determines encryption and decryption between the first distributed node and the second distributed node.

4. The method according to claim 1, wherein the first distributed node receives a first IP address of the second distributed node from the at least one coordinating node.

5. The method according to claim 1, further comprising:
   adding at least one new distributed node to the network, wherein the at least one coordinating node determines a location of the at least one new distributed node and checks authentication information comprised in the at least one new distributed node;
   removing a first key between the first distributed node and the second distributed node;
   exchanging a second key between the at least one new distributed node and both the first distributed node and the second distributed node; and
   exchanging a second IP address between the at least one new distributed node and both the first distributed node and the second distributed node.

6. The method according to claim 1, further comprising:
   removing a third distributed node from the network, wherein removing comprises:
      the at least one coordinating node checking for a partitioned network; and
      removing, from a first neighbor of the third distributed node, a public key of the third distributed node; and
      creating a direct connection between the first neighbor and a second neighbor of the third distributed node.

7. The method according to claim 1, wherein the first distributed node and the second distributed node are connected by at least one data line, wherein the first distributed node and the second distributed node are connected to the at least one coordinating node.

8. A computer program product comprising a computer readable storage medium having a computer readable program stored therein, wherein the computer readable program, when executed by a processor, causes the processor to perform a method comprising:
   receiving, from a coordinating node, by a first distributed node of a distributed computing network that comprises a plurality of distributed nodes, a parameter dataset for an artificial-intelligence model, wherein the parameter dataset received by the first distributed node includes initial data;
   decrypting, by the first distributed node, the parameter dataset using a first key associated with the first distributed node;
   adding, by the first distributed node, a first parameter dataset to the parameter dataset to create an updated parameter dataset;
   encrypting, by the first distributed node, the updated parameter dataset using a second key associated with a second distributed node of the distributed computing network;
   transmitting, by the first distributed node, the encrypted updated parameter dataset to the second distributed node;
   removing, by the coordinating node, the initial data from the parameter dataset after each distributed node of the plurality of distributed nodes has added data to the parameter dataset; and
   publishing, after removing the initial data from the parameter dataset, the artificial-intelligence model.

9. The computer program product of claim 8, wherein the publishing the artificial-intelligence model is performed by the coordinating node.

10. The computer program product of claim 8, wherein the publishing the artificial-intelligence model is performed by one of the plurality of distributed nodes.

11. The computer program product of claim 8, wherein the method further comprises:
   receiving, by the first distributed node, from the coordinating node, an identifier for the second distributed node;
   receiving, by the first distributed node, the second key from the second distributed node using the identifier for the second distributed node.

12. The computer program product of claim 8, wherein the method further comprises:
   determining, by the coordinating node, that a new distributed node is to be added to the network of distributed nodes between the first distributed node and the second distributed node;
   removing, from the first distributed node, the second key;
   exchanging a first new key between the first distributed node and the new distributed node, wherein the first new key allows the first distributed node to encrypt data such that the new distributed node can decrypt the data; and
   exchanging a second new key between the new distributed node and the second distributed node, wherein the second new key allows the new distributed node to encrypt data such that the second distributed node can decrypt the data.

13. The computer program product of claim 12, wherein the method further comprises:
   providing, by the coordinating node, a first IP address for the new distributed node to the first distributed node; and
   providing, by the coordinating node, a second IP address for the second distributed node to the new distributed node.

14. A system comprising:
   a coordinating node; and
   a distributed network coordinated by the coordinating node, the distributed network having a plurality of distributed nodes, wherein each of the plurality of distributed nodes is communicatively coupled to two other distributed nodes,
   wherein each respective distributed node is configured to perform a method comprising:
      receiving a parameter dataset from a first distributed node, the parameter dataset having been encrypted by the first distributed node using a first public key associated with the respective distributed node;
      decrypting the parameter dataset using a first private key associated with the respective distributed node;
      adding a new set of data to the parameter dataset to create an updated parameter dataset;
      encrypting the updated parameter dataset using a second public key associated with a second distributed node of the plurality of distributed nodes; and
      transmitting the encrypted updated parameter dataset to the second distributed node;
   wherein one of (i) the coordinating node or (ii) one of the plurality of distributed nodes is configured to perform a second method comprising:
      removing, after each distributed node of the plurality of distributed nodes has added data to the parameter dataset, initial data from the parameter dataset; and
      publishing an artificial-intelligence model after removing the initial data from the parameter dataset.

15. The system of claim 14, wherein the distributed network is arranged in a ring network topology such that the parameter dataset is transmitted around the ring of distributed nodes, with each distributed node updating the parameter dataset to include new data, prior to publishing the artificial-intelligence model that uses the parameter dataset.

16. The system of claim 14, wherein the second method further comprises:
   generating the parameter dataset using the initial data for the artificial-intelligence model; and
   transmitting the generated parameter dataset to a distributed node of the plurality of distributed nodes.

17. The system of claim 14, wherein the method further comprises:
   receiving, from the coordinating node, an identifier for the second distributed node;
   initiating a key exchange with the second distributed node using the identifier for the second distributed node; and
   receiving the second public key from the second distributed node.

18. The system of claim 14, wherein the parameter dataset is associated with the artificial-intelligence model, the parameter dataset comprising a set of weights for parameters in the artificial-intelligence model, and wherein adding the new set of data to the parameter dataset comprises adding weight changes to the parameter dataset.

* * * * *